(12) United States Patent
Nelson et al.

(10) Patent No.: US 11,044,448 B1
(45) Date of Patent: Jun. 22, 2021

(54) AERIAL VEHICLE WITH SPECTRAL SHAPING FILTERING

(71) Applicant: Sentera, Inc., Minneapolis, MN (US)

(72) Inventors: Ryan Nelson, Minneapolis, MN (US); Eric Taipale, Minneapolis, MN (US)

(73) Assignee: Sentera, Inc., Minneapolis, MN (US)

( * ) Notice: Subject to any disclaimer, the term of this patent is extended or adjusted under 35 U.S.C. 154(b) by 0 days.

(21) Appl. No.: 16/538,272

(22) Filed: Aug. 12, 2019

(51) Int. Cl.
| | |
|---|---|
| *H04N 9/64* | (2006.01) |
| *H04N 5/235* | (2006.01) |
| *H04N 5/238* | (2006.01) |
| *B64C 39/02* | (2006.01) |
| *B64D 47/08* | (2006.01) |
| *A01B 79/00* | (2006.01) |

(52) U.S. Cl.
CPC ........... *H04N 9/646* (2013.01); *B64C 39/024* (2013.01); *B64D 47/08* (2013.01); *H04N 5/238* (2013.01); *H04N 5/2351* (2013.01); *A01B 79/005* (2013.01); *B64C 2201/027* (2013.01); *B64C 2201/123* (2013.01)

(58) Field of Classification Search
CPC ...... H04N 9/646; H04N 5/238; H04N 5/2351; B64C 39/024; B64C 2201/027; B64C 2201/123; B64D 47/08; A01B 79/005
See application file for complete search history.

(56) References Cited

U.S. PATENT DOCUMENTS

| | | | | |
|---|---|---|---|---|
| 2009/0022189 A1* | 1/2009 | Okuno | ................... | G02F 1/3513 372/25 |
| 2012/0262571 A1* | 10/2012 | Wang | ................... | H04N 5/2256 348/135 |
| 2019/0195689 A1* | 6/2019 | McQuilkin | ........... | G01J 3/0297 |

OTHER PUBLICATIONS

Topalis (Ambient Light Sensor Integration—Frangiskos V. Topalis and Lambros T. Doulos, Springer International Publishing Switzerland 2017, R. Karlicek et al. (eds.), Handbook of Advanced Lighting Technology, DOI 10.1007/978-3-319-00176-0_33) (Year : 2017).*

* cited by examiner

*Primary Examiner* — Nasim N Nirjhar
(74) *Attorney, Agent, or Firm* — Hamre, Schumann, Mueller & Larson, P.C.

(57) ABSTRACT

Spectral filtering or shaping is applied to an imaging system of an aerial vehicle such as a UAV to ensure that the measurements between a camera system and an ambient light sensor system are proportional under all light conditions. The spectral filtering is applied so that the resulting spectral sensitivity curves of the ambient light sensor system and of the camera system are proportional to one another over a spectral region. Thereafter, it is determined if there is a difference between a target ambient lighting condition and a real-time ambient lighting condition collected by the ambient light sensor system when an image was obtained. If a difference exists, a color correction can be applied to the image. This results in more accurate color correction and more spectrally accurate and consistent images.

16 Claims, 9 Drawing Sheets

Fig. 9

AERIAL VEHICLE WITH SPECTRAL SHAPING FILTERING

FIELD

The technology described herein generally relates to imaging from aerial vehicles including, but not limited to, unmanned aerial vehicles (UAVs) using cameras.

BACKGROUND

Cameras have become a common tool used in aerial imaging applications such as in agricultural applications. In the case of agricultural applications, by photographing plants and isolating various color spectra, it is possible to learn more about the health of the plants than could be gained with the naked eye. Typically, the cameras are specifically filtered to isolate regions of interest in the color spectrum which can be used to measure plant health characteristics. The collected images from the cameras are often corrected to account for the ambient lighting conditions to provide more consistent day-to-day spectral measurements. Atmospheric conditions, variations in time of day, and cloud cover can all result in different ambient spectral properties and therefore variation in spectral measurements from the cameras. Commonly the correction is done by using an ambient light sensor along with the camera. The light sensor measures the ambient light condition at the time the photos are taken and a color correction is applied to the photos in an attempt to ensure that all photos are consistent and calibrated.

Figure 1A:
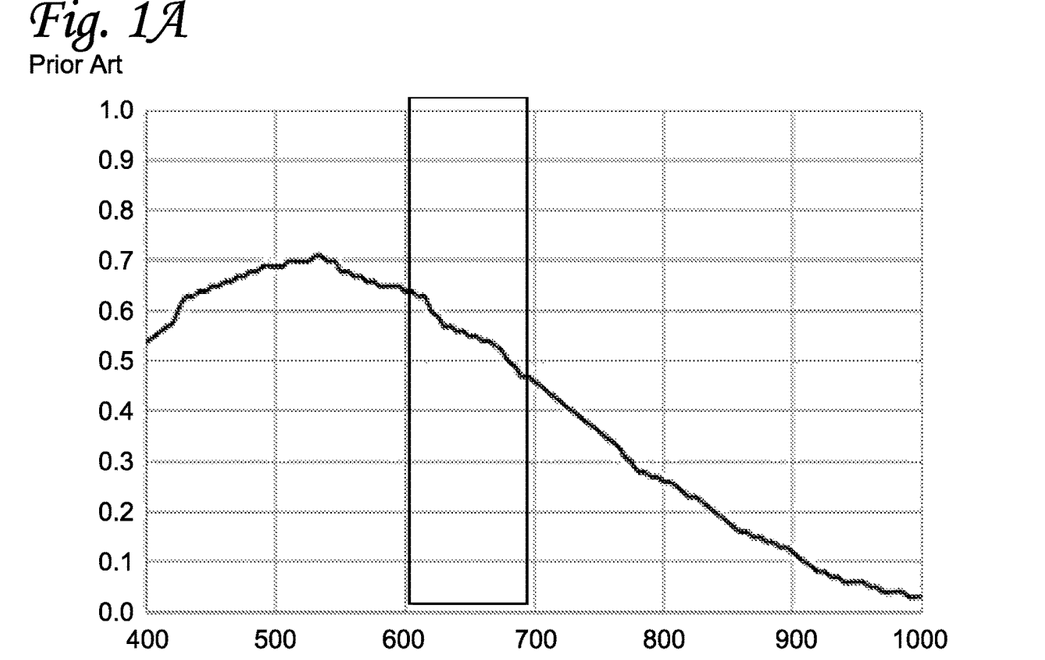
FIGS. 1A and 1B illustrate examples of conventional spectral sensitivity curves of conventional camera systems and conventional ambient light sensor systems, respectively, used with unmanned aerial vehicles.
Figure 1B:
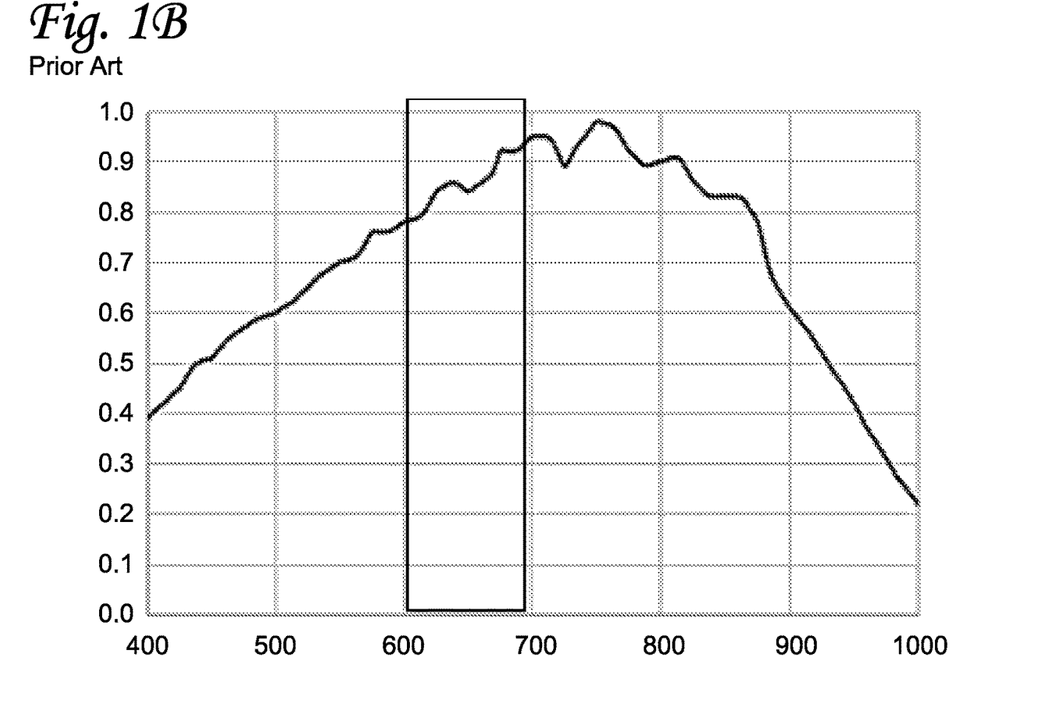

A challenge in implementing this type of correction system is that the spectral sensitivity curves of the camera sensor and the ambient light sensor typically are not proportional to one another. For example, FIG. 1A depicts a typical spectral sensitivity curve of a monochrome camera sensor while FIG. 1B depicts a typical spectral sensitivity curve of a monochrome ambient light sensor. If one were interested in imaging plants in the red spectral region ranging from 600 nm to 700 nm as indicated by the boxed areas in FIGS. 1A and 1B, this spectral region would be isolated using a bandpass filter that would only allow the light to pass in this spectral region. However, as evident from FIGS. 1A and 1B, the shapes of the spectral sensitivity curves in these two regions are not proportional to one another. The camera sensor is more sensitive to the lower wavelengths as indicated in FIG. 1A while the ambient light sensor is more sensitive to the higher wavelengths as indicated in FIG. 1B. This creates uncertainty in correlating what is sensed by the camera sensor and the ambient light sensor. Further, spectral inaccuracy in the photos will be created if the ambient light sensor measurements are used to correct the photos captured by the camera sensor based on the sensed ambient light conditions.

SUMMARY

Techniques are described herein whereby spectral filtering (also referred to as spectral shaping or spectral shaping filtering) is applied to components of an imaging system used with an aerial vehicle such as a UAV to ensure that the resulting spectral sensitivity curves of a camera system and an ambient light sensor system are proportional to (i.e. match) one another, in particular over a selected spectral region. This results in more accurate color correction and more spectrally accurate and consistent photos.

The spectral filtering can be applied to the ambient light sensor system, to the camera system, or to both the ambient light sensor system and the camera system. In one embodiment, in order to preserve maximum light collection of the camera system, the spectral filtering can be applied only to the ambient light sensor system. The spectral filtering can be implemented in any manner that is suitable for achieving the proportional spectral sensitivity curves of the ambient light sensor system and of the camera system.

In one embodiment, the spectral filtering can be applied the ambient light sensor system and/or to the camera system prior to launching the aerial vehicle to ensure that one knows that the resultant spectral sensitivity curves of the camera system and the ambient light sensor system are proportional to one another before launching the aerial vehicle.

In one embodiment, an aerial imaging system can include an aerial vehicle, and a camera system mounted on the aerial vehicle, where the camera system includes a lens and a first light sensing device. An ambient light sensor system, which can be mounted on the aerial vehicle or away from the aerial vehicle, for example on the ground, includes a second light sensing device. In addition, there can be a spectral shaping filter in front of the second light sensing device of the ambient light sensor system and/or there can be a spectral shaping filter in front of the first light sensing device of the camera system. The spectral shaping filter(s) are designed so that the resulting spectral sensitivity curves of the ambient light sensor system and of the camera system are proportional to one another over at least a selected spectral region.

In another embodiment, an aerial imaging system can include an aerial vehicle, and a camera system mounted on the aerial vehicle. The camera system can be configured to have a first spectral sensitivity curve over a first spectral region based on reflected light received thereby. The system can further include an ambient light sensor system which can be mounted on the aerial vehicle or away from the aerial vehicle, for example on the ground. The ambient light sensor system can be configured to have a second spectral sensitivity curve over the first spectral region based on ambient light received thereby. The first spectral sensitivity curve is proportional to the second spectral sensitivity curve over the first spectral region.

In another embodiment, a method of color correcting an image obtained by a camera system mounted on an aerial vehicle can include launching the aerial vehicle with the camera system having a first spectral sensitivity curve over a first spectral region that is proportional to a second spectral sensitivity curve of an ambient light sensor system over the first spectral region. The image is then obtained using the camera system and as the image is being obtained real-time ambient lighting condition data is collected using the ambient light sensor system. A difference, if any, between a target ambient lighting condition and the real-time ambient lighting condition collected by the ambient light sensor system when the image was obtained is then determined. A color correction can then be applied to the image based on any determined difference.

DETAILED DESCRIPTION

Systems and methods are described where an aerial imaging system can include an aerial vehicle, such as a UAV, having a camera system (also referred to as an imaging system). The aerial imaging system can further include an ambient light sensor system that can be mounted on the aerial vehicle or mounted remotely from the UAV, for example on the ground or even on another aerial vehicle. The camera system and the ambient light sensor system are each configured to have a respective spectral sensitivity curve. Spectral filtering is applied to the ambient light sensor system, to the camera system, or to both the ambient light sensor system and the camera system so that the resulting spectral sensitivity curves are proportional to one another. The determination that the spectral sensitivity curves of the ambient light sensor system and the camera system are proportional to one another can occur prior to launching the aerial vehicle, for example by comparing the spectral sensitivity curves and/or by lab testing.

The term "ambient light sensor system" or "incident light sensor system" as used herein is intended to encompass a system that can detect any wavelength of ambient or incident electromagnetic radiation, and is not limited to detecting visible light unless explicitly indicated in the claims.

To assist in describing the concepts herein, the aerial vehicle will be described as a UAV, with the camera system mounted on the UAV, and the ambient light sensor system can be mounted either on the UAV or away from the UAV. The aerial imaging system will be described as being used to image plants growing in a field(s) for precision agriculture to improve farming management. However, the aerial imaging system described herein can be used to analyze other agronomic information, such as soil conditions, for precision agriculture to improve farming management. The aerial imaging system described herein may also be used in non-agronomy applications for example imaging non-agricultural plants such as trees. Further, the aerial imaging system can be used in many other applications.

Figure 2:
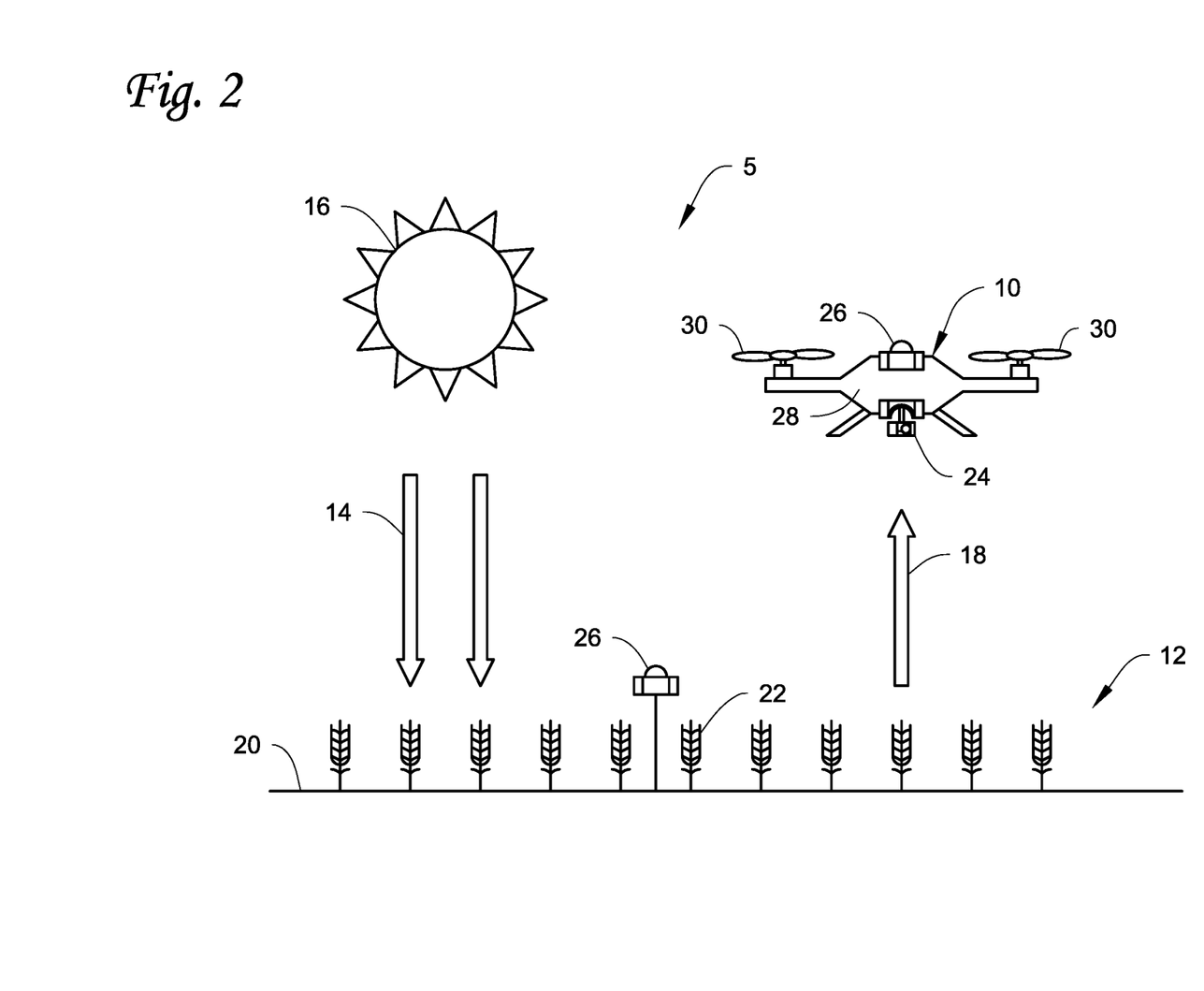
FIG. 2 illustrates an example environment in which an aerial vehicle described herein can operate.

FIG. 2 illustrates an example environment 5 where a UAV 10 described herein can be used. In this example, a field 12 receives incident light 14, for example sunlight from the sun 16, with the incident light 14 being reflected by the field 12 (for example the soil 20, plants/crops 22 growing in the soil 20, other vegetation growing in the soil 20, etc.) in the form of reflected light 18 to a camera system 24 (also referred to as an imaging system or an image capture device) mounted on the UAV 10. The camera system 24 captures images of the field 12 which can then be analyzed to gather information about the field 12, for example the condition of the plants 22 and/or the condition of the soil 20. In some embodiments, the UAV 10 can further include an ambient light sensor system 26 (also referred to as an incident light sensor system) mounted thereon that senses the ambient light 14 that is incident on the UAV 10. In other embodiments, the ambient light sensor system 26 can be mounted on the ground as depicted in FIG. 2, or both an ambient light sensor system 26 mounted on the UAV 10 and a ground mounted ambient light sensor system 26 can be used. The UAV 10 itself can be of conventional construction including a central fuselage 28 to which the camera system 24 and in some embodiments the ambient light sensor system 26 are mounted, and a plurality of, for example four, rotors 30.

In embodiments where the ambient light sensor system 26 is mounted on the UAV 10, the ambient light sensor system 26 can be mounted at any location on the UAV 10 to receive a desired amount of incident light sufficient to indicate ambient lighting conditions. For example, the ambient light sensor system 26 is illustrated as being mounted at or near the top of the fuselage 28, for example at or near the center, to detect the ambient or incident light 14. However, in other embodiments the ambient light sensor system 26 can be mounted at other locations on the UAV 10.

In embodiments where the ambient light sensor system 26 is mounted away from, i.e. not on, the UAV 10, the ambient light sensor system 26 can be mounted at any location that can provide an accurate measurement of the ambient or incident lighting conditions encountered by the UAV 10 as the UAV 10 is capturing images. In the example illustrated in FIG. 2, the ambient light sensor system 26 is shown as being mounted on the ground, for example within the plants/crops 22 in the field 12. In the illustrated example, the ambient light sensor system 26 is shown as being mounted on a mast or other structure that elevates the ambient light sensor system 26 so that it is located above the plants/crops 22 so that the incident light can be sensed without interference from the plants/crops 22. However, the ambient light sensor system 26 can be mounted directly on the ground as well.

Still referring to FIG. 2, the camera system 24 is illustrated as being mounted at or near the bottom of the fuselage 28, for example at or near the center, to capture images of the field 12. However, in other embodiments the camera system 24 can be mounted at other locations on the UAV 10.

Figure 3:
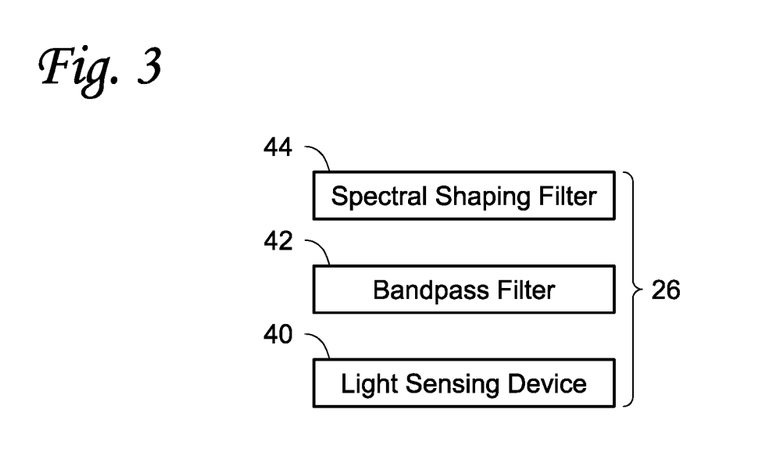
FIG. 3 schematically illustrates one example of an ambient light sensor system having spectral shaping described herein.

Referring to FIG. 3, in one embodiment the ambient light sensor system 26 can include a light sensing device 40, a bandpass filter 42, and a spectral shaping filter 44. In this example, the spectral shaping filter 44 is located in front of the light sensing device 40, with the bandpass filter 42 located between the spectral shaping filter 44 and the light sensing device 40. In other embodiments, the spectral shaping filter 44 can be located between the bandpass filter 42 and the light sensing device 40 (see FIG. 7B). In still other embodiments, more than one spectral shaping filter can be provided to result in the desired spectral sensitivity curve of the light sensing device 40.

The light sensing device 40 can be any type of sensing device that can sense light impinging thereon. In one non-limiting example, the light sensing device 40 can be a linear or area focal plane array, formed by an array of detection elements. The detection elements can be photoresistors, photodiodes, phototransistors or any other elements suitable for being arranged in an array and for detecting electromagnetic waves. The general construction and operation of the light sensing device 40 is well known in the art.

The bandpass filter 42 can be any filtering device that controls the spectrum/wavelengths of light that reaches the light sensing device 40. The general construction and operation of the bandpass filter 42 is well known in the art.

The spectral shaping filter 44 (which can also be referred to as a light shaping filter) can be any shaping filter device that shapes or modifies the incoming incident light 14 before impinging on the light sensing device 40 so that the resulting spectral sensitivity curve of the light sensing device 40 is different than what it would normally be without the presence of the spectral shaping filter 44 and is proportional to the spectral sensitivity curve of the camera system 24 within the spectral region determined by the bandpass filter 42. The general construction and operation of spectral shaping filters is well known in the art. One example of a specific type of spectral shaping filter that could be used includes, but is not limited to, a gain flattening filter, also known as a gain equalizing filter, that is designed to flatten or smooth out unequal signal intensities over a specified wavelength range. Further information on gain flattening filters can be found at https://www.iridian.ca/technical-resources/optical-filter-tutorials/gain-flattening-filter-gff-tutorial/.

Figure 4:
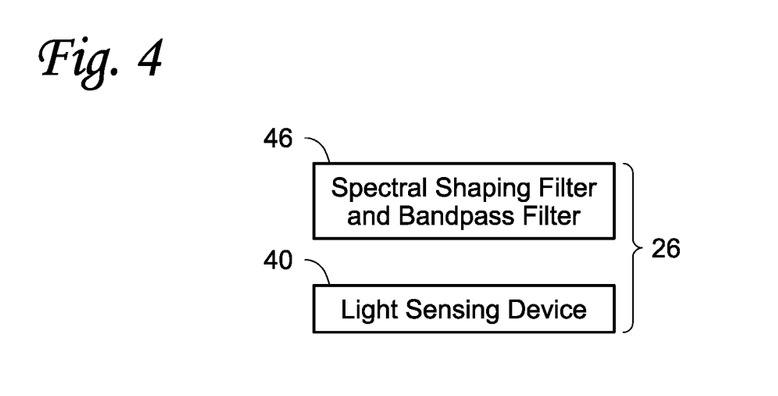
FIG. 4 schematically illustrates another example of an ambient light sensor system having spectral shaping described herein.

FIG. 4 illustrates another embodiment of the ambient light sensor system 26 where the bandpass filter 42 and the spectral shaping filter 44 are combined into a single structure 46 that performs the functions of both the bandpass filter 42 and the spectral shaping filter 44.

Figure 5:
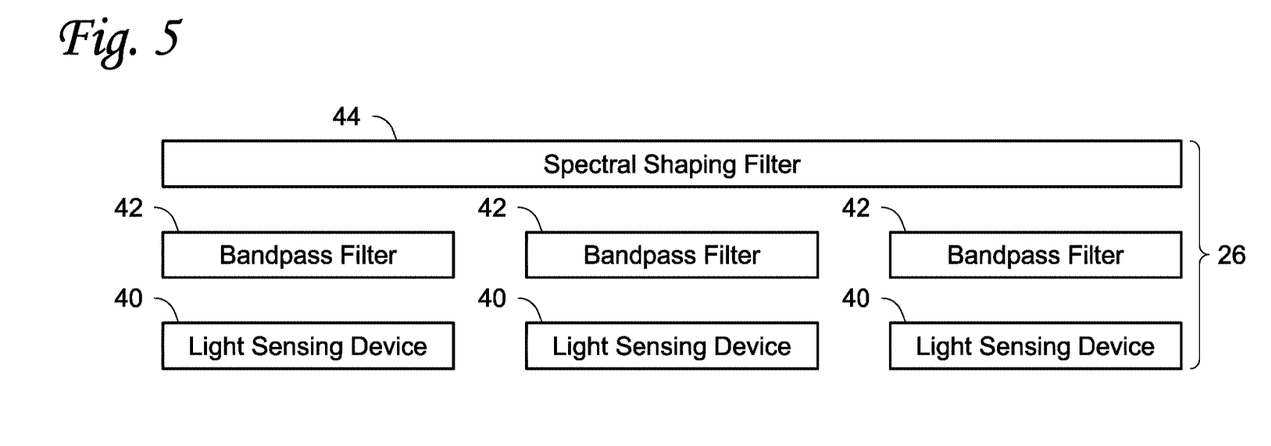
FIG. 5 schematically illustrates another example of an ambient light sensor system having spectral shaping described herein.

FIG. 5 illustrates another embodiment of the ambient light sensor system 26 which uses multiple light sensing devices 40. For example, each light sensing device 40 can sense a distinct wavelength of light, in which case each bandpass filter 42 is configured to control the spectrum/wavelength of light that reaches its associated light sensing device 40 to the desired wavelength. In this embodiment, a single spectral shaping filter 44 can be utilized for all of the light sensing device 40/bandpass filter 42 combinations. Alternatively, a separate spectral shaping filter 44 can be used for each one of the light sensing device 40/bandpass filter 42 combinations.

Figure 6:
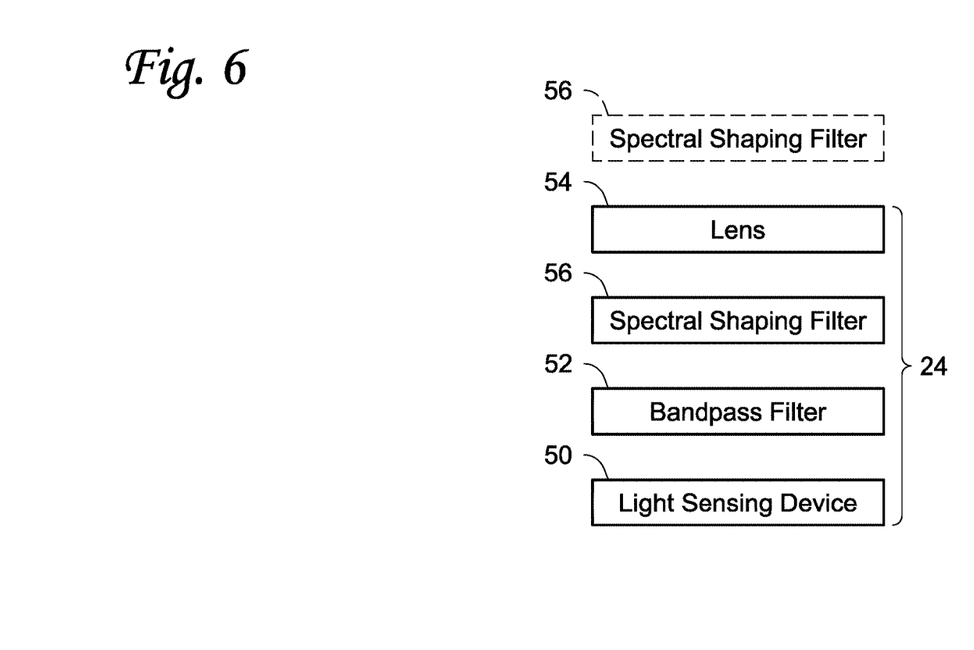
FIG. 6 schematically illustrates an example of a camera system having spectral shaping described herein.

FIG. 6 illustrates an example where spectral shaping is applied to the camera system 24. The spectral shaping of the camera system 24 can be separate from or in addition to any spectral shaping that takes place in the ambient light sensor system 26.

In the example illustrated in FIG. 6, the camera system 24 includes a light sensing device 50 that can be any type of sensing device that can sense light impinging thereon. In one non-limiting example, the light sensing device 50 can be a linear or area focal plane array, formed by an array of detection elements. The detection elements can be photoresistors, photodiodes, phototransistors or any other elements suitable for being arranged in an array and for detecting electromagnetic waves.

A bandpass filter 52 is provided in front of the light sensing device 50 that controls the spectrum/wavelengths of light that reaches the light sensing device 50. Typically, the spectrum/wavelengths of light passed by the bandpass filter 52 will match the spectrum/wavelengths of light passed by the bandpass filter 42 of the ambient light sensor system 26. In addition, a lens 54 is provided. The lens 54 can be any type of lens having any shape and/or configuration depending upon the desired optical characteristics, such as the field of view or other optical characteristics, of the camera system 24. In one non-limiting example, the lens 54 can be a focusing lens.

In FIG. 6, a spectral shaping filter 56 (which can also be referred to as a light shaping filter) is provided which can be any shaping filter device that shapes or modifies the incoming reflected light 18 before impinging on the light sensing device 50 so that the resulting spectral sensitivity curve of the light sensing device 50 is different than what it would normally be without the presence of the spectral shaping filter 56 and is proportional to the spectral sensitivity curve generated by the ambient light sensor system 26 within the spectral region determined by the bandpass filter 52. The spectral shaping filter 56 can have a construction that is similar to the spectral shaping filter 44.

In the example in FIG. 6, the spectral shaping filter 56 can be located in front of the light sensing device 50, for example with the bandpass filter 52 located between the spectral shaping filter 56 and the light sensing device 50. In other embodiments, the spectral shaping filter 56 can be located between the bandpass filter 52 and the light sensing device 50. In still other embodiments, the spectral shaping filter 56 can be located in front of the lens 54 as indicated by dashed lines in FIG. 6, or a first spectral shaping filter can be located in from the lens 54 and a second spectral shaping filter can be located between the lens 54 and the light sensing device 50. Many other arrangements are possible.

Figure 7A:
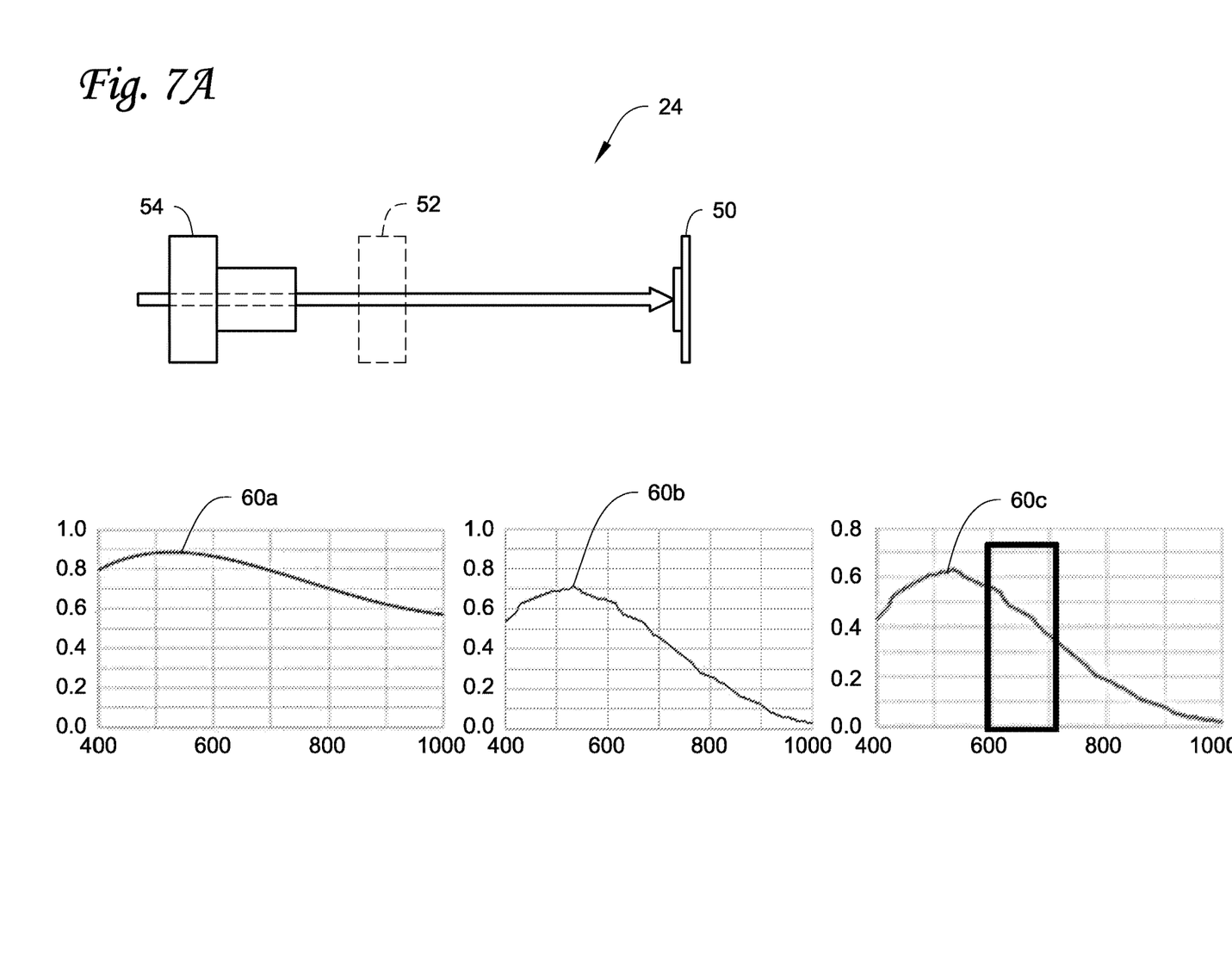
FIGS. 7A and 7B illustrate a comparison of the camera system and the ambient light sensor system with spectral shaping as described herein.
Figure 7B:
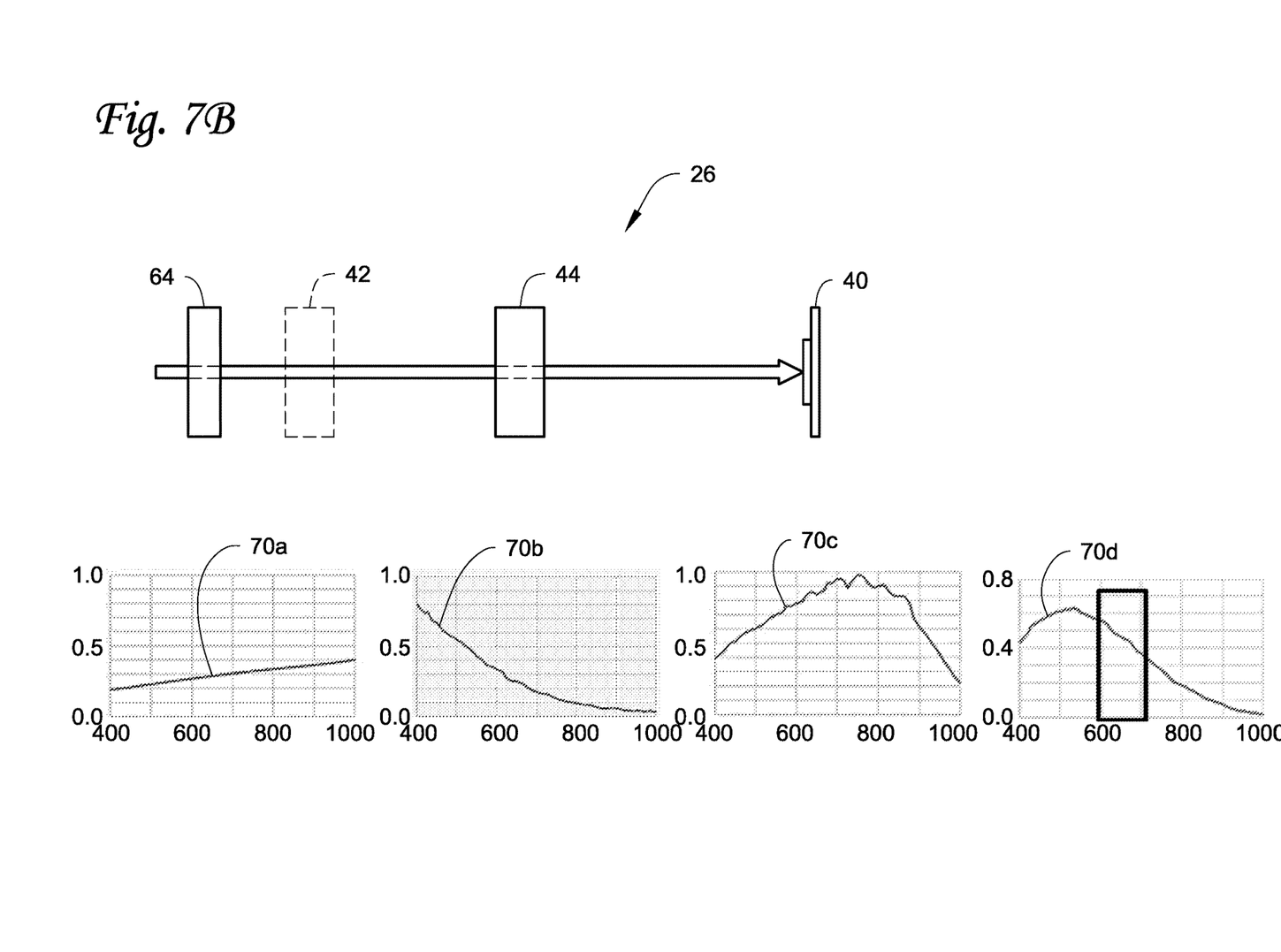

Referring to FIGS. 7A and 7B, an example comparison of the camera system 24 and the ambient light sensor system 26 with spectral shaping as described herein is illustrated. To ensure the most accurate color correction, the design of the spectral shaping filter(s) used should consider all optical elements of the ambient light sensing system and of the camera system that could affect the spectral response from the light sensing devices 40, 50. For example, lenses, diffusers, anti-reflective coatings, and the like should also be included in the analysis to achieve proportional sensitivity curves.

In the example in FIG. 7A, the camera system 24 is illustrated as including the light sensing device 50, the bandpass filter 52 and the lens 54. The camera system 24 is illustrated without a spectral shaping filter in this example. FIG. 7A also illustrates what the spectral sensitivity curve 60a of the lens 54 by itself is, what the spectral sensitivity curve 60b of the light sensing device 50 by itself would be without the preceding optical elements, as well as the resulting spectral sensitivity curve 60c of the light sensing device 50 within the spectral region dictated by the bandpass filter 52 indicated in the boxed area.

In the example in FIG. 7B, the ambient light sensor system 26 is illustrated as including the light sensing device 40, the bandpass filter 42 and the spectral shaping filter 44 located between the bandpass filter 42 and the light sensing device 40. This example also illustrates an optional diffuser or neutral density filter 64 in front of the bandpass filter 42 which can be useful for optimizing the sensitivity of the ambient light sensor system 26. FIG. 7B also illustrates what the spectral sensitivity curve 70a of the diffuser 64 by itself is, what the spectral sensitivity curve 70b of the spectral shaping filter 44 by itself is, what the spectral sensitivity curve 70c of the light sensing device 40 by itself would be without the preceding optical elements, as well as the resulting spectral sensitivity curve 70d of the light sensing device 40 within the spectral region dictated by the bandpass filter 42 indicated in the boxed area.

As can be seen from FIGS. 7A and 7B, the spectral sensitivity curve 70d of the ambient light sensor system 26 within the spectral region is proportional to the spectral sensitivity curve 60c of the camera system 24 within the spectral region. The spectral sensitivity curves 60c, 70d need not be identically proportional to one another. However, the spectral sensitivity curves 60c, 70d should at least be generally proportional to one another, or substantially proportional to one another, or preferably identically proportional to one another.

Figure 7C:
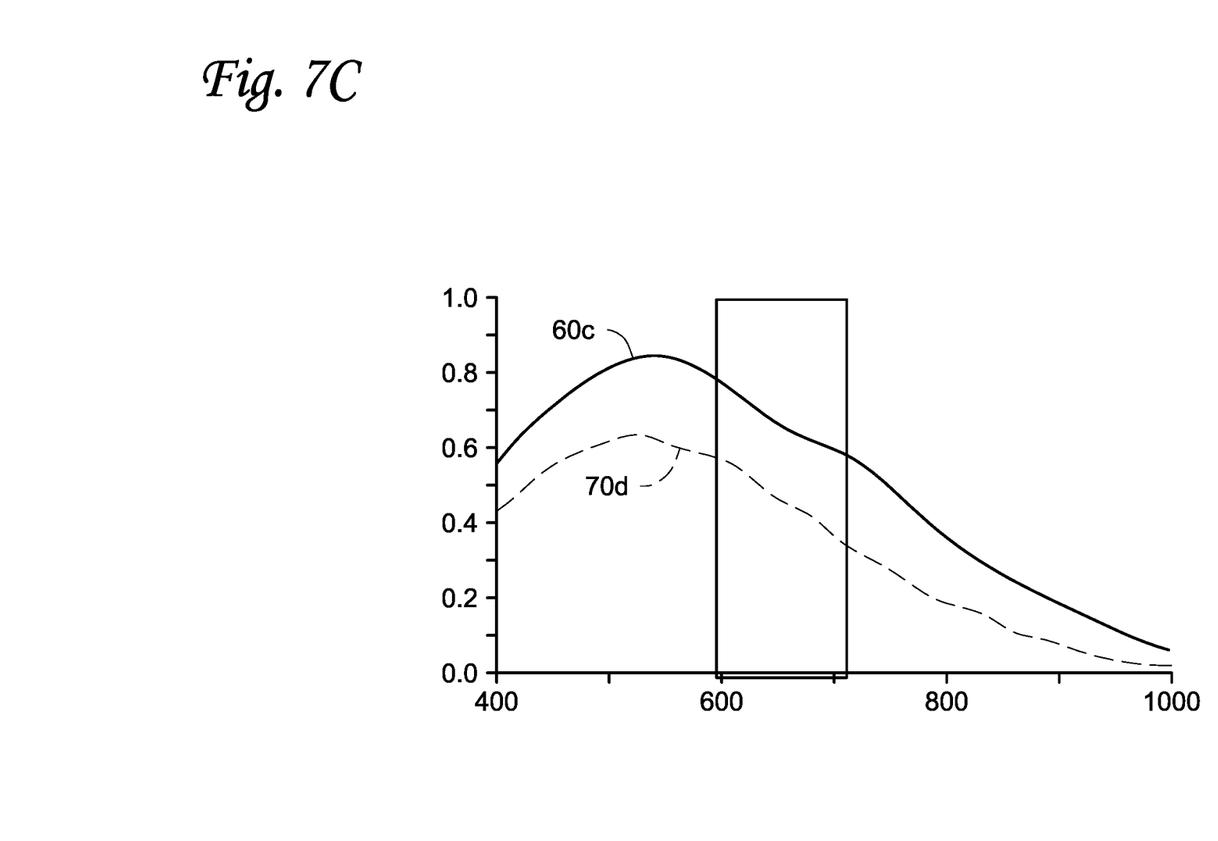
FIG. 7C illustrates another example of proportional spectral sensitivity curves of the camera system and the ambient light sensor system.

In FIGS. 7A and 7B, the sensitivity curves 60c, 70d within the boxed area of the spectral region are proportional to one another by having substantially identical shapes, including substantially identical amplitudes of the curves. However, identically shaped curves 60c, 70d are not required in order to be considered proportional curves. For example, FIG. 7C shows an example of the sensitivity curve 60c and the sensitivity curve 70d that are considered to be proportional to one another, as described herein, within the boxed area of the spectral region. In the example of FIG. 7C, the amplitude of the sensitivity curve 60c is larger than the amplitude of the sensitivity curve 70d in the spectral region. However, the ratios of the sensitivity curves 60c, 70d are substantially the same across the entire spectral region and therefore the sensitivity curves 60c, 70d are considered to be proportional to one another.

The terms "matching", "match", or "proportional match" may be used in place of the term "proportional". The resulting spectral sensitivity curves of the ambient light sensor system and the camera system are considered to be proportional to one another if the curves maintain substantially the same ratio across the spectral region of interest. The following example helps to explain the meaning of the term "proportional": if the resultant sensitivity of the camera system at 400 nm is 2× the sensitivity of the ambient light sensor system at 400 nm, the sensitivity of the camera system should be 2× the sensitivity of the ambient light sensor system across the entire spectral region of interest.

Figure 8A:
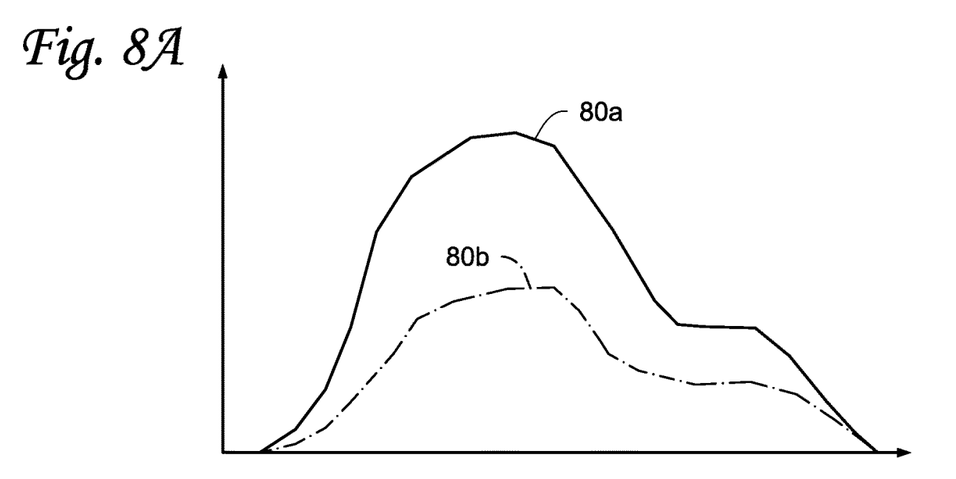
FIGS. 8A-C illustrate determining the normalized total difference between the spectral sensitivity curves of the camera system and the ambient light sensor system.
Figure 8B:
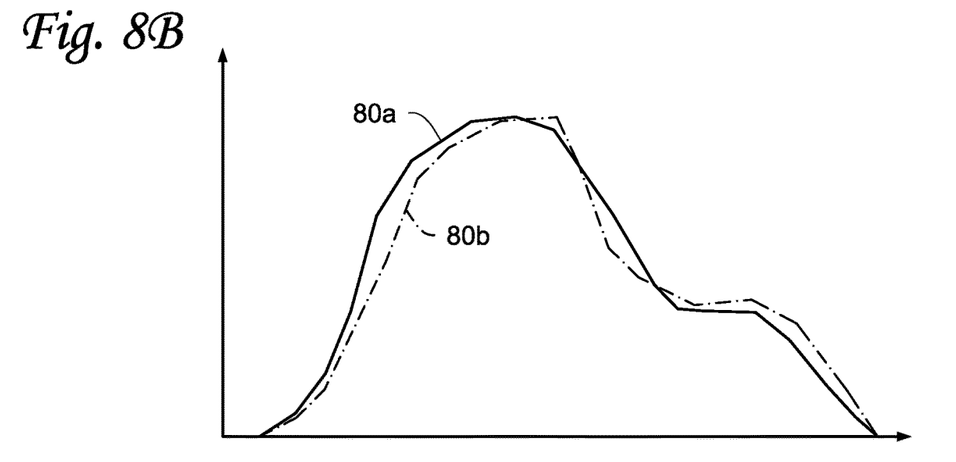

Another technique for determining if the resulting spectral sensitivity curves are proportional to or match one another is to determine the normalized total difference between the resulting spectral sensitivity curves. For example, FIG. 8A illustrates an example of a spectral sensitivity curve 80a of the camera system and a spectral sensitivity curve 80b of the ambient light sensor system. In FIG. 8B, the two curves 80a, 80b in FIG. 8A are then normalized by scaling the curves to make the areas under the curves match one another. Then, in FIG. 8C, the total amount of difference between the two normalized curves is measured by determining the area between the normalized curves indicated by the shading in FIG. 8C. The lower the difference in area between the normalized curves, the greater the proportionality or match between the curves 80a, 80b. If the area between the normalized curves is zero, the curves 80a, 80b identically match one another. It is preferred that the difference in area be minimized. In one embodiment, the difference in area between the normalized curves should be 10% or less. In another embodiment, the difference in area between the normalized curves should be 5% or less. In still another embodiment, the difference in area between the normalized curves should be 1% or less. However, any spectral shaping filtering as described herein that results in an improved match between the sensitivity curves is beneficial, regardless of the difference in area between the normalized curves (i.e. regardless of how well the sensitivity curves match one another).

Figure 8C:
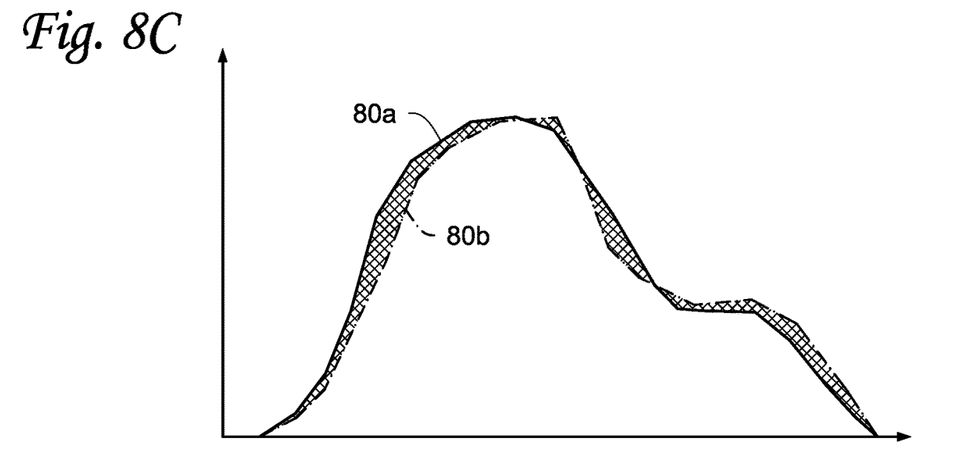

Although FIGS. 8A-C illustrate determining the normalized total difference between the resulting spectral sensitivity curves 80a, 80b over the entire extent of the curves 80a, 80b, other variations are possible. For example, the normalized total difference between the sensitivity curves 80a, 80b, or just determining the difference in area between the normalized sensitivity curves, can be determined over a specific spectral region or wavelength range of the curves 80a, 80b rather than over the entire extent of the curves 80a, 80b.

In general, the spectral shaping described herein is applied to the ambient light sensor system 26 and/or to the camera system 24 so that it is known in advance, i.e. prior to flight of the UAV 10, that the resulting spectral sensitivity curves of the camera system 24 and the ambient light system 26 are proportional one another. Once it is determined that the resulting spectral sensitivity curves are sufficiently proportional to one another, the UAV 10 is launched and while the camera system 24 is obtaining images, the real-time ambient lighting conditions at the time each image is obtained are measured using the ambient light sensor system 26. The real-time ambient lighting conditions data can be correlated with the images, for example using a time stamp or other correlation technique.

The images from the camera can then be color adjusted if there is a difference between a target lighting condition (or target ambient lighting condition) that can be established by the user and the detected real-time ambient lighting condition at the time an image is obtained. The target lighting condition is the lighting condition that the user determines would require no color adjustment to the images. For example, in one embodiment, pure white light (i.e. light of a consistent intensity across the entire collected light range) could be established as the target lighting condition. In this example, the ambient light sensor system 26 would be used to determine how and if the lighting conditions when each image is obtained varies from the pure white light, i.e. varies from the target lighting condition. For each image, if a difference exists, a color correction can then be applied to the pixel data from the camera sensor 24. For example, if the target lighting condition is pure white light and if the real-time ambient lighting condition detected by the ambient light sensor system 26 at the time an image was obtained was deemed to be weighted more in the blue spectral region, the color correction applied to the image could include a reduction in the blue intensity of the image to account for that.

In another embodiment, a "typical sunlight" condition could be set as the target lighting condition and color corrections could be applied to the image(s) based on any variation between that target lighting condition and the real-time detected ambient lighting condition. In still another embodiment, the target lighting condition could be generated from the real-time ambient lighting data collected during flight of the UAV 10. For example, an average lighting condition during the flight of the UAV 10 could be calculated from the real-time ambient lighting data collected during flight of the UAV 10 and used as the target lighting condition.

Figure 9:
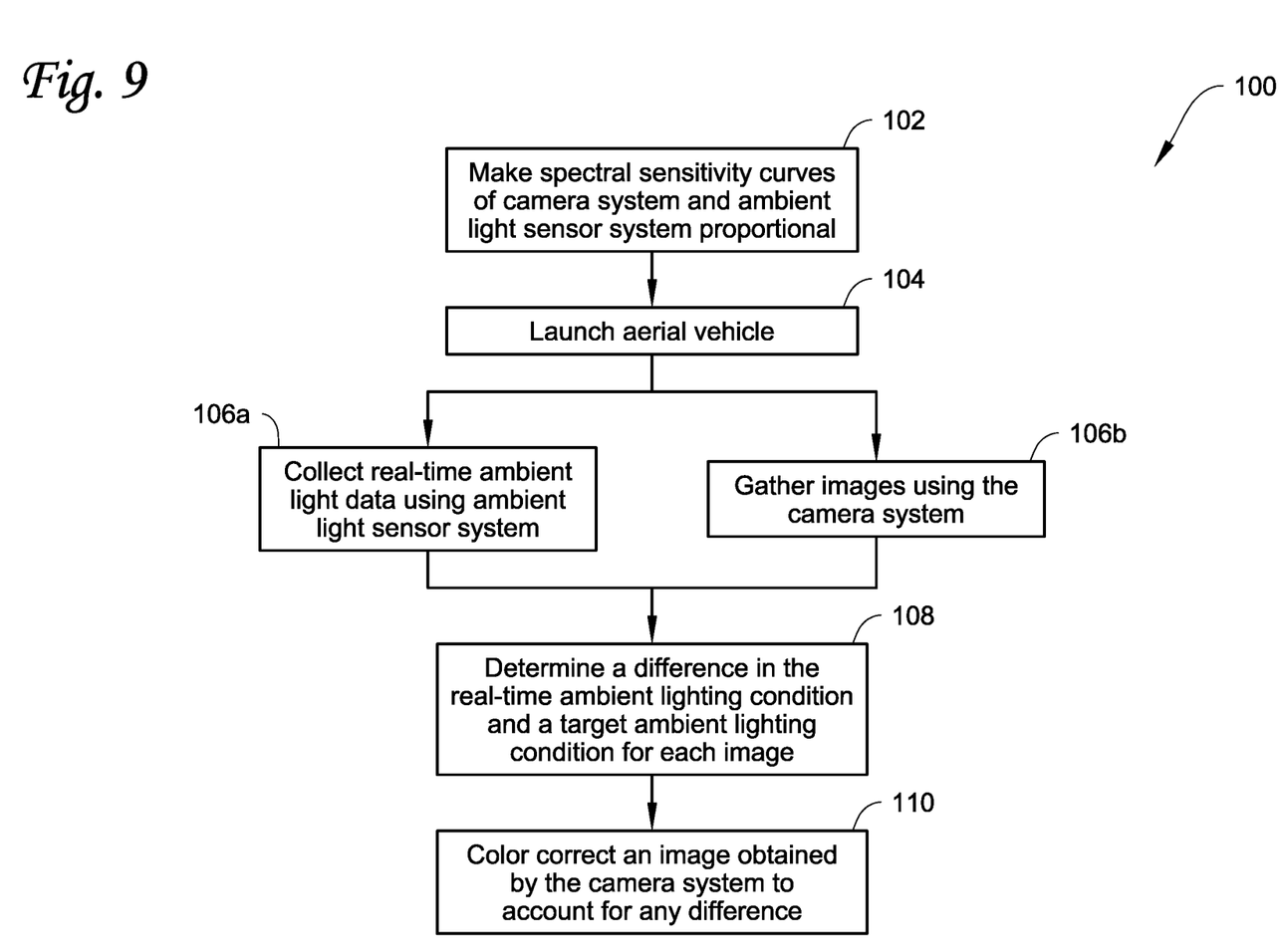
FIG. 9 schematically illustrates an example method of color correcting images of plants obtained by a camera system using spectral shaping described herein.

FIG. 9 illustrates an example method 100 that implements the techniques described herein. Referring to FIGS. 2 and 9, in the method 100, at box 102 the spectral sensitivity curves of the camera system 24 and the ambient light sensor system 26 are made proportional to one another. Once the proportionality is achieved, at box 104 the UAV 10 is launched. While the UAV 10 is in flight, at box 106a real-time ambient lighting conditions data is collected by the ambient light sensor system 26, and at the same time at box 106b images are gathered using the camera system 24. The real-time ambient lighting conditions data can be correlated with each one of the images, for example using a time stamp. At box 108, it is then determined if there is difference between a target ambient lighting condition and the real-time ambient lighting condition for each image at the time each image is taken. At box 110, a color correction can be applied to any image where there is a difference between the target ambient lighting condition and the real-time ambient lighting condition at the time the image was obtained.

The determination(s) in box 108 and the color correction in box 110 in FIG. 9 can occur in real-time using one or more data processing systems on the UAV 10 or separate from the UAV 10. Alternatively, the determination(s) in box 108 and the color correction in box 110 in FIG. 9 can occur in one or more data processing systems after the UAV 10 has landed. The data from the camera system 24 and from the ambient light sensor system 26 (if mounted on the UAV 10) can be transmitted from the UAV 10 to the one or more data processing systems, or the data can be obtained from the UAV 10 once it lands.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. An aerial imaging system, comprising:
  an aerial vehicle;
  a camera system mounted on the aerial vehicle, the camera system includes a lens and a first light sensing device, the camera system is configured to have a first spectral sensitivity curve over a first spectral region based on reflected light received thereby, the camera system includes a first bandpass filter that limits light reaching the first light sensing device to the first spectral region, and the camera system is configured to obtain images while the aerial vehicle is in flight;
  an ambient light sensor system separate from the camera system, the ambient light sensor system includes a second light sensing device, the ambient light sensor system is configured to have a second spectral sensitivity curve over the first spectral region based on ambient light received thereby, the ambient light sensor system includes a second bandpass filter that limits light reaching the second light sensing device to the first spectral region, and the ambient light sensor system is configured to collect real-time ambient lighting data for each image at the time each image is obtained by the camera system;
  at least one of the following:
  a) a spectral shaping filter in front of the second light sensing device of the ambient light sensor system;
  b) a spectral shaping filter in front of the first light sensing device of the camera system; and
    wherein the spectral shaping filter is configured so that the first spectral sensitivity curve is proportional to the second spectral sensitivity curve over the first spectral region;
  the aerial imaging system is configured to determine if there is a difference between a target ambient lighting condition and the real-time ambient lighting data for each image at the time each image is obtained; and
  for one of the images where there is a difference between the target ambient lighting condition and the real-time ambient lighting data for the one image, the aerial imaging system is configured to apply a color correction to the one image.

2. The aerial imaging system of claim 1, wherein the camera system and the ambient light sensor system each includes a spectral shaping filter.

3. The aerial imaging system of claim 1, wherein the ambient light sensor system is mounted on the aerial vehicle.

4. The aerial imaging system of claim 1, wherein the aerial vehicle is an unmanned aerial vehicle.

5. An aerial imaging system, comprising:
  an aerial vehicle;
  a camera system mounted on the aerial vehicle, the camera system has a first light sensing device, and the camera system is configured to have a first spectral sensitivity curve over a first spectral region based on reflected light received thereby, the camera system includes a first bandpass filter that limits light reaching the first light sensing device to the first spectral region, and the camera system is configured to obtain images while the aerial vehicle is in flight;
  an ambient light sensor system, the ambient light sensor system includes a second light sensing device, and the ambient light sensor system is configured to have a second spectral sensitivity curve over the first spectral region based on ambient light received thereby, the ambient light sensor system includes a second bandpass filter that limits light reaching the second light sensing device to the first spectral region, and the ambient light sensor system is configured to collect real-time ambient lighting data for each image at the time each image is obtained by the camera system;
  wherein the camera system and the ambient light sensor system are configured so that a difference in area between a normalized curve of the first spectral sensitivity curve and a normalized curve of the second spectral sensitivity curve over the first spectral region is 10% or less;
  the aerial imaging system is configured to determine if there is a difference between a target ambient lighting condition and the real-time ambient lighting data for each image at the time each image is obtained; and
  for one of the images where there is a difference between the target ambient lighting condition and the real-time ambient lighting data for the one image, the aerial imaging system is configured to apply a color correction to the one image.

6. The aerial imaging system of claim 5, wherein the difference in area is 5% or less.

7. The aerial imaging system of claim 5, wherein the difference in area is 1% or less.

8. The aerial imaging system of claim 5, wherein the camera system or the ambient light sensor system includes a spectral shaping filter that is configured so that the difference in area between the normalized curve of the first spectral sensitivity curve and the normalized curve of the second spectral sensitivity curve over the first spectral region is 10% or less.

9. The aerial imaging system of claim 5, wherein the camera system and the ambient light sensor system each includes a spectral shaping filter wherein the spectral shaping filters are configured so that the difference in area between the normalized curve of the first spectral sensitivity curve and the normalized curve of the second spectral sensitivity curve over the first spectral region is 10% or less.

10. The aerial imaging system of claim 5, wherein the ambient light sensor system is mounted on the aerial vehicle.

11. The aerial imaging system of claim 5, wherein the aerial vehicle is an unmanned aerial vehicle.

12. An aerial imaging system, comprising:
an aerial vehicle;
a camera system mounted on the aerial vehicle, the camera system has a first light sensing device, and the camera system is configured to have a first spectral sensitivity curve over a first spectral region based on reflected light received thereby, the camera system includes a first bandpass filter that limits light reaching the first light sensing device to the first spectral region, and the camera system is configured to obtain images while the aerial vehicle is in flight;
an ambient light sensor system, the ambient light sensor system includes a second light sensing device, and the ambient light sensor system is configured to have a second spectral sensitivity curve over the first spectral region based on ambient light received thereby, the ambient light sensor system includes a second bandpass filter that limits light reaching the second light sensing device to the first spectral region, and the ambient light sensor system is configured to collect real-time ambient lighting data for each image at the time each image is obtained by the camera system;
wherein the camera system and the ambient light sensor system are configured so that a ratio between the first spectral sensitivity curve and the second spectral sensitivity curve across the entire first spectral region is substantially constant;
the aerial imaging system is configured to determine if there is a difference between a target ambient lighting condition and the real-time ambient lighting data for each image at the time each image is obtained; and
for one of the images where there is a difference between the target ambient lighting condition and the real-time ambient lighting data for the one image, the aerial imaging system is configured to apply a color correction to the one image.

13. The aerial imaging system of claim 12, wherein the camera system or the ambient light sensor system includes a spectral shaping filter that is configured so that the ratio between the first spectral sensitivity curve and the second spectral sensitivity curve across the entire first spectral region is substantially constant.

14. The aerial imaging system of claim 12, wherein the camera system and the ambient light sensor system each includes a spectral shaping filter wherein the spectral shaping filters are configured so that the ratio between the first spectral sensitivity curve and the second spectral sensitivity curve across the entire first spectral region is substantially constant.

15. The aerial imaging system of claim 12, wherein the ambient light sensor system is mounted on the aerial vehicle.

16. The aerial imaging system of claim 12, wherein the aerial vehicle is an unmanned aerial vehicle.

* * * * *